Patented Nov. 4, 1930

1,780,559

UNITED STATES PATENT OFFICE

AXEL B. LAFTMAN, OF BAYONNE, NEW JERSEY, ASSIGNOR, BY MESNE ASSIGNMENTS, TO THE GRASSELLI CHEMICAL COMPANY, OF CLEVELAND, OHIO, A CORPORATION OF DELAWARE

METHOD OF REDUCING THE ZINC-OXIDE CONTENT OF LITHOPONE

No Drawing.    Application filed December 22, 1926.    Serial No. 156,520.

The invention relates to a method of precipitating crude lithopone substantially free from zinc oxide and other zinc compounds soluble in acetic acid.

In the manufacture of lithopone it is very desirable to obtain the maximum content of zinc sulfide, and the minimum content of zinc oxide and other acetic acid-soluble zinc usually referred to as zinc oxide compounds, in the finished product which should correspond as closely as possible to the theoretical formula 70% $BaSO_4$.30% ZnS. During the process of manufacture, which process comprises the operations of precipitating the crude lithopone by treating an aqueous solution of barium sulfide with an aqueous solution of zinc sulfate, filtering and drying the crude lithopone, calcining the dried crude lithopone in an atmosphere substantially free from oxygen, quenching the calcined lithopone in an aqueous fluid and drying and grinding said quenched product in an atmosphere substantially free from oxygen, objectionable zinc compounds soluble in acetic acid, as, for example, zinc oxide, may be formed, and this formation of said objectionable zinc compounds may be traceable to one or more of the following conditions: 1st—The presence of barium hydroxide or similar compounds in the barium sulfide solution used. When barium sulfide, ordinarily produced from heavy spar, and which is to be used in the precipitation of crude lithopone, is allowed to remain in storage for any extended period subsequent to its reduction and prior to its solution, there is a tendency for oxidation to take place, with the formation of some barium oxide. The barium sulfide solution prepared therefrom will contain some barium hydroxide, and this barium hydroxide naturally will precipitate its equivalent of zinc oxide or zinc hydroxide. 2nd—The presence of zinc oxide or zinc hydroxide in the zinc sulfate solution used. When dissolving zinc or zinc compounds in sulfuric acid to form zinc sulfate, it often transpires that, unless the exact proportions of zinc and acid very carefully are maintained, a quite basic zinc sulfate solution is obtained, which may be assumed to contain some zinc oxide or zinc hydroxide dissolved in the zinc sulfate solution. This zinc oxide or hydroxide gives rise to zinc oxide in the crude lithopone precipitate. 3rd—The oxidizing effect of air inadvertently entering the calcining apparatus. 4th—In the finishing operation, the addition of compounds capable of precipitating any soluble zinc salts in the form of the oxide, or insoluble zinc salts acting like the oxide.

It is a fact that lithopone manufacturers hitherto have considered it commercially impossible to decrease the acetic acid-soluble zinc compounds content of the finished lithopone pigment below about from 3.0% to 0.5% by weight. It has been suggested that the acetic acid-soluble zinc compounds content might be decreased by the addition to the calcined lithopone of sulfates of zinc, cadmium or mercury, or by treating the calcined and quenched lithopone with dilute sulfuric acid or with metallic carbonates, and the like. Such procedures have proven to be disadvantageous.

An object of the present invention is to provide a method for the substantially complete elimination of acetic acid-soluble zinc compounds from the slurry of crude (i. e., uncalcined) lithopone.

The invention is based upon my discovery of the fact that the beforementioned acetic acid-soluble zinc compounds which may be present in the crude lithopone slurry may be converted into a water-soluble zinc salt, for example, into zinc sulfate, by the addition thereto of an amount of an acid capable of converting said acetic acid-soluble zinc compounds into water-soluble zinc salts, for example, sulfuric acid, proportionate to the content of said acetic acid-soluble zinc compounds, and that the said water-soluble zinc salt may be caused to react with a predetermined additional amount of barium sulfide, thereby forming an additional amount of lithopone. A slurry so prepared, when finished off and filtered in the usual manner, directly yields a "green cake" (i. e., a press cake of crude, uncalcined lithopone) which is substantially free from acetic acid-soluble zinc compounds and requires no washing.

The following detailed description of a procedure in accordance with my invention will serve to illustrate the same: An aqueous solution of barium sulfide having a density of about from 18° to 19° Baumé is prepared in any known manner, and maintained at a temperature of about 130° F. Separately, an aqueous solution of zinc sulfate having a density of about from 37° to 38° Baumé is prepared in any known manner, and maintained at a temperature of about 130° F.

About 9600 pounds of the above-mentioned zinc sulfate solution are transferred into a suitable tank provided with an agitator. Then the above-mentioned barium sulfide solution gradually is added thereto, with agitation, until the resulting slurry comprising barium sulfate and zinc sulfide has only a faint acid reaction to litmus, indicating a slight excess of zinc sulfate. The reaction is exothermic, and the temperature of the slurry at this stage is about 170° F. There is then added to the slurry a predetermined amount of acid, for example, about 150 pounds of dilute sulfuric acid having a density of 15° Baumé at room temperature. After agitation of the acidified slurry for about 15 minutes, a sample of the slurry is filtered. To 10 c. c. of the filtrate there is added 1 cc. of N/10 sodium hydroxide solution and a drop of methyl orange indicator (0.10% solution). If the test solution is red, indicating an acid reaction, the slurry is agitated for another 15 minutes. If, however, the test solution is yellow, indicating a basic reaction, an additional amount of acid, as, for example, about 150 pounds of dilute sulfuric acid of about 15° Baumé, is added to the slurry and the above process is repeated. Subsequently barium sulfide is added to the slightly acid slurry until the latter is faintly basic to phenolphthalein, thereby converting the zinc sulfate formed from the acetic acid-soluble zinc compounds by the sulfuric acid treatment into insoluble zinc sulfide. The slurry now comprises crude lithopone substantially free from acetic-acid soluble zinc compounds. That is to say, the amount of said compounds is not in excess of about from 0.18% to 0.25% by weight calculated on the lithopone.

Although, by the carrying out of this process, the crude lithopone so obtained will be found to contain only about from 0.18% to 0.06% by weight of said compounds, it is possible to reduce the quantity thereof by prolonged acid digestion or by further repeated treatments of the slurry with decreasing amounts of acid and barium sulfide solution, to about 0.02% or less.

The crude lithopone slurry so obtained is then dewatered, calcined, quenched, dewatered and ground in the known manner.

Although in the above detailed description the specific acid used is sulfuric acid, it is to be understood that the invention is not limited thereto, but includes the use of any operable inorganic or organic acid capable of converting zinc oxide, zinc hydroxide, or other acetic acid-soluble zinc compounds into water-soluble zinc salts which are convertible into insoluble zinc sulfide by treatment with a soluble sulfide; for example, nitric acid, hydrochloric acid, acetic acid or the like.

What I claim is:

In processes of making lithopone involving the operations of treating an aqueous solution containing zinc sulfate with an aqueous solution containing barium sulfide, to the production of a slurry containing crude lithopone, and thereafter transforming any acetic acid soluble compounds incidentally precipitated with the lithopone slurry into water-soluble zinc compounds by a treatment with a predetermined small amount of an acid, the step which consists in adding to the acidified slurry containing the water-soluble zinc compounds an amount of barium sulfide calculated to react with said water-soluble zinc compounds to the production of an additional amount of crude lithopone.

In testimony whereof, I affix my signature.

AXEL B. LAFTMAN.